(12) United States Patent
Tsouvalas et al.

(10) Patent No.: US 11,149,964 B2
(45) Date of Patent: Oct. 19, 2021

(54) FLOW CONTROL MODULE AND METHOD FOR CONTROLLING THE FLOW IN A HYDRONIC SYSTEM

(71) Applicant: GRUNDFOS HOLDING A/S, Bjerringbro (DK)

(72) Inventors: Agisilaos Tsouvalas, Silkeborg (DK); Casper Hillerup Lyhne, Aabyhøj (DK)

(73) Assignee: GRUNDFOS HOLDING A/S, Bjerringbro (DK)

( * ) Notice: Subject to any disclaimer, the term of this patent is extended or adjusted under 35 U.S.C. 154(b) by 254 days.

(21) Appl. No.: 16/269,918

(22) Filed: Feb. 7, 2019

(65) Prior Publication Data

US 2019/0242593 A1 Aug. 8, 2019

(30) Foreign Application Priority Data

Feb. 8, 2018 (EP) .................................... 18155861

(51) Int. Cl.
*F24D 19/10* (2006.01)
*F24F 11/63* (2018.01)
(Continued)

(52) U.S. Cl.
CPC ..... *F24D 19/1015* (2013.01); *F24D 19/1006* (2013.01); *F24D 19/1012* (2013.01);
(Continued)

(58) Field of Classification Search
CPC ............. F24D 19/1015; F24D 19/1006; F24D 19/1012; F24D 3/105; F24D 3/02;
(Continued)

(56) References Cited

U.S. PATENT DOCUMENTS 1,257,801 A * 2/1918 Burke ........................ F24D 3/02
237/8 R
2,559,253 A * 7/1951 Lingen ................ F24D 19/1024
237/8 C
(Continued)

FOREIGN PATENT DOCUMENTS

DE          3227147 A1 * 3/1984     ......... F24D 19/1015
DE          3328189 A1 * 3/1984     ......... G05D 23/1931
(Continued)

*Primary Examiner* — Steven B McAllister
*Assistant Examiner* — Daniel E. Namay
(74) *Attorney, Agent, or Firm* — McGlew and Tuttle, P.C.

(57) ABSTRACT

A hydronic system (1) includes a side (3) with a first port (21) connected with a source element output (23), a second port (27) connected with a source element input (29), and a controllable primary side flow actuator (9) for providing a primary side flow ($q_1$). Another side (5) has a third port (31) connected with a load element input (33), a fourth port (35) connected with a load element output (37), and a controllable secondary side flow actuator (13) providing a secondary side flow ($q_2$). A transfer element (17) is connected with the first port, the second port, the third port and the fourth port. A flow control module (39) adapts a transfer element thermal power transfer by controlling the primary side flow actuator and/or the secondary side flow actuator by minimizing a signed deviation value ($\Delta\Delta v$) that is correlated with the transfer element thermal power transfer.

24 Claims, 11 Drawing Sheets

(51) Int. Cl.
 *G05B 15/02* (2006.01)
 *G05D 23/19* (2006.01)
(52) U.S. Cl.
 CPC .............. *F24F 11/63* (2018.01); *G05B 15/02* (2013.01); *G05D 23/1931* (2013.01)
(58) Field of Classification Search
 CPC ........ F24D 3/10; F24F 11/63; G06D 23/1931; G05D 16/028
 USPC ............................................ 237/8 R, 8 A, 65
 See application file for complete search history.

(56) References Cited

U.S. PATENT DOCUMENTS

| | | | | |
|---|---|---|---|---|
| 2,560,282 | A * | 7/1951 | Geisseler | G05D 23/1934 237/8 C |
| 3,382,917 | A * | 5/1968 | Rice | F24D 11/00 165/272 |
| 4,708,287 | A * | 11/1987 | De Wit | F24D 19/1033 237/8 R |
| 5,138,845 | A | 8/1992 | Mannion et al. | |
| 6,299,071 | B1 * | 10/2001 | Fiedrich | F24D 19/1015 237/70 |
| 8,774,978 | B2 | 7/2014 | Higgins et al. | |
| 8,978,748 | B2 * | 3/2015 | Perrin | F24D 19/1012 165/292 |
| 9,080,789 | B2 * | 7/2015 | Hamstra | H02J 3/14 |
| 9,519,297 | B1 | 12/2016 | Virskus | |
| 10,012,395 | B2 * | 7/2018 | Olesen | F24D 3/08 |
| 10,690,423 | B2 * | 6/2020 | Kallesoe | F24F 3/08 |
| 2008/0179416 | A1 * | 7/2008 | Johnson | F24D 19/1012 237/8 A |
| 2010/0180629 | A1 | 7/2010 | Ueda et al. | |
| 2011/0077781 | A1 * | 3/2011 | Milder | F24D 12/02 700/282 |
| 2014/0008051 | A1 * | 1/2014 | O'Donnell | F01P 7/165 165/297 |
| 2015/0013961 | A1 * | 1/2015 | Perrin | F24D 19/1069 165/298 |
| 2015/0014425 | A1 * | 1/2015 | Olesen | F24D 19/1069 237/8 C |
| 2015/0136377 | A1 | 5/2015 | Kallesøe et al. | |
| 2016/0320094 | A1 * | 11/2016 | Madeira | F24D 3/02 |
| 2018/0291908 | A1 * | 10/2018 | Blad | F24D 3/105 |
| 2020/0393160 | A1 * | 12/2020 | Tsouvalas | F24F 11/84 |

FOREIGN PATENT DOCUMENTS

| | | | | |
|---|---|---|---|---|
| DE | 3328190 | A1 * | 3/1984 | ............. G05D 23/20 |
| DE | 3340351 | A1 * | 5/1985 | ......... F24D 19/1015 |
| FR | 2634873 | A1 * | 2/1990 | ......... F24D 19/1024 |
| JP | 2016217657 | A * | 12/2016 | ........... F24D 3/1008 |

\* cited by examiner

FLOW CONTROL MODULE AND METHOD FOR CONTROLLING THE FLOW IN A HYDRONIC SYSTEM

CROSS REFERENCE TO RELATED APPLICATIONS

This application claims the benefit of priority under 35 U.S.C. § 119 of European Application 18155861.0, filed Feb. 8, 2018, the entire contents of which are incorporated herein by reference.

TECHNICAL FIELD

The present disclosure is directed to a flow control module and a method for controlling the flow in a hydronic system for use in a heating, ventilating, and air-conditioning (HVAC) system of a building.

BACKGROUND

Typically, hydronic systems are designed to operate at a design temperature differential (ΔT) between a primary loop comprising thermal power source, e.g. a heater, a chiller, a heat exchanger and/or a common line coupling, and a secondary loop comprising a thermal power consuming load, e.g. a radiator and/or an air handling unit (AHU). It is known that hydronic systems may suffer from an undesirable effect known as the "low ΔT syndrome". For a variety of reasons such as dirty chiller coils or system components not designed for the same temperature differential, the actual temperature differential may fall below the design temperature differential, which leads to a less energy-efficient operation of the hydronic system.

U.S. Pat. No. 8,774,978 B2 describes a water cooling system with a primary loop, a secondary loop and an intermediary decoupler or bypass connecting the primary loop and the secondary loop. Therein, the problems of the low ΔT syndrome are tackled by a demand flow device performing an event-based triggered re-adjustment of the new temperature differential supply setpoint.

SUMMARY

The flow control module according to the present disclosure provides a more efficient and stable solution to the low ΔT syndrome. For instance, new switched-in components replacing or supplementing other components of a hydronic system may result in a new design temperature differential that is not known or difficult to determine or estimate. The flow control module disclosed herein allows an efficient and stable operation of a hydronic system with an unknown, undefined or varying design temperature differential. The flow control module disclosed herein enables a continuous or regular adaptation of the current thermal power supply to the current thermal power demand and vice versa without controlling a temperature differential supply setpoint.

According to a first aspect of the present disclosure, a flow control module for controlling the flow in a hydronic system is provided, wherein the hydronic system comprises
a primary side with a first port in fluid connection with an output of at least one source element, a second port in fluid connection with an input of at least one source element, and at least one controllable primary side flow actuator for providing a primary side flow,
a secondary side with a third port in fluid connection with an input of at least one load element, a fourth port in fluid connection with an output of at least one load element, and at least one controllable secondary side flow actuator for providing a secondary side flow, and an intermediary transfer element between the primary side and the secondary side, wherein the intermediary transfer element is in fluid connection with the first port, the second port, the third port and the fourth port.

Said flow control module is configured to adapt the thermal power transfer of the intermediary transfer element by controlling the primary side flow by means of the at least one controllable primary side flow actuator and/or the secondary side flow by means of the at least one controllable secondary side flow actuator in a continuous or regularly closed-loop manner based on minimizing a signed deviation value being correlated with the thermal power transfer of the intermediary transfer element.

The term "thermal power" Q may be defined herein as $Q = \rho \cdot c \cdot q \cdot T$, wherein $\rho$ is the fluid density, c is the heat capacity of the fluid, q is the flow and the T is the temperature of the fluid. The term "thermal power transfer" by fluid flowing from a port A to a port B may be defined herein as a dimensionless variable $Q_B/Q_A$ ranging from 0 to 1, wherein $Q_A$ is the thermal power at port A and $Q_B$ is the thermal power at port B.

Optionally, the thermal power transfer of the intermediary transfer element from the first port to the second port and/or the thermal power transfer of the intermediary transfer element from the fourth port to the third port may be minimized by this continuous or regularly closed-loop control of the flow(s). Optionally, the thermal power transfer from the first port to the third port and/or the thermal power transfer from the fourth port to the second port may be maximized by this continuous or regularly closed-loop control of the flow(s). The controllable primary/secondary side flow actuator may for instance be a speed-controllable pump or a combination of a fixed-speed pump with a controllable valve. Controlling the primary/secondary side flow may thus comprise controlling the speed of a primary/secondary side pump and/or the opening degree of a primary/secondary side valve. As alternatives to controlling a pump speed, the power consumption, the stator flux and/or stator current of the pump's electric motor may be controlled to control the flow(s). It should be understood that the hydronic system may comprise a group of two or more intermediary transfer elements.

The hydronic system may be a heating and/or cooling system. The source element may be a heater, a chiller, a heat exchanger and/or a common line coupling consuming chemical, thermal, mechanical or electrical energy for providing thermal power to the primary side of the hydronic system. The load element may be a fan coil unit (FCU), an air handling unit (AHU), an anti-condensate baffle (ACB), a ceiling cooling, a radiator, an underfloor heating, or the like, consuming thermal power at the secondary side of the hydronic system for providing it to a place or object in need for thermal power, i.e. heating or cooling.

The intermediary transfer element may be a common line, also known as "decoupler", decoupling the flow in the primary side from the flow in the secondary side. For instance, when a load valve (e.g. a radiator thermostat) in the secondary side may be closed due to low demand for thermal power, a flow in the primary side may continue through the common line. The common line may also be denoted as "bypass" or "shunt", because the flow in the primary side is able to bypass a load element in the secondary side via the common line. Another name for the common line is "close Tees", because the schematic representation of the common line may resemble two letters "T" being connected with their legs. One end of the common line may be a first T-connection connecting the first and the third port, and the other end of the common line may be a second T-connection connecting the fourth and the second port. Optionally, the intermediary transfer element may be a heat exchanger thermally coupling the primary side and the secondary side in a parallel flow or counter flow configuration. Optionally, the intermediary transfer element may be a hydraulic separator or a tank. A hydraulic separator or a tank may be regarded as a wide common line with heat exchanger functionality. In case of a common line, a hydraulic separator or a tank, the pressure of the primary side may be decoupled from the pressure in the secondary side by means of pressure valves. In case of a heat exchanger, the primary side and the secondary side may be fully decoupled in terms of pressure without the need of decoupling pressure valves. As the fluid in the primary side does not mix in the heat exchanger with the fluid of the secondary side, different fluids may be used in the primary side and in the secondary side. However, most preferably, water is used as the fluid in both the primary side and the secondary side.

The term "closed-loop control" shall mean that the signed deviation value is used as a feedback value to be minimized by adapting the flow(s). The signed deviation value is correlated with the thermal power transfer of the intermediary transfer element and influenced by the flow(s). The flow control module may thus be denoted as a feedback controller. The signed deviation value may be received and/or determined by the flow control module based on one or more measured variables. The closed-loop control is not event-triggered, but essentially continuous or regularly, which means that, also during "stable" operation of the hydronic system, the flow control module receives and/or determines essentially continuously or regularly the signed deviation value and adapts essentially continuously or regularly the flow(s) accordingly. The flow(s) may stabilize when the signed deviation value is close to or at a minimum.

The closed-loop control of the flow(s) on the basis of the signed deviation value as feedback thus reduces or prevents the negative effects of the low $\Delta T$ syndrome very efficiently. No event-based re-calibration to a new design temperature differential is needed. As the signed deviation value is correlated with the thermal power transfer of the intermediary transfer element, the closed-loop control quickly adapts the flow(s) so that a low $\Delta T$ syndrome does not establish in the first place. The flow control module disclosed herein allows the design temperature differential of the hydronic system to be unknown or undefined. For instance, a new component configured for an unknown or other design temperature differential than the hydronic system may be installed in the hydronic system without causing a low $\Delta T$ syndrome. This gives far more flexibility for maintaining and/or extending the hydronic system by replacing or adding components. Furthermore, the current thermal power supply is adapted to the current thermal power demand and vice versa without controlling a temperature differential supply setpoint.

Optionally, the signed deviation value may be a difference between a first differential and a second differential, wherein the first differential is a differential between any two measured variables of a group of four variables and the second differential is a differential between the other two measured variables of said group of four variables, wherein the group of four variables comprises a first variable of fluid flowing through the first port, a second variable of fluid flowing through the second port, a third variable of fluid flowing through the third port, and a fourth variable of fluid flowing through the fourth port. Optionally, the first variable may be the temperature $T_1$ and/or pressure $p_1$ of fluid flowing through the first port, the second variable may be the temperature $T_2$ and/or pressure $p_2$ of fluid flowing through the second port, the third variable may be the temperature $T_3$ and/or pressure $p_3$ of fluid flowing through the third port, and the fourth variable may be the temperature $T_4$ and/or pressure $p_4$ of fluid flowing through the fourth port.

The first differential may for instance be $\Delta T_1 = T_1 - T_4$ or $\Delta T = T_1 - T_3$ or $\Delta T_1 = T_3 - T_4$, and the second differential may for instance be $\Delta T_2 = T_3 - T_2$ or $\Delta T_2 = T_2 - T_4$ or $\Delta T_2 = T_1 - T_2$, respectively. Analogously, in case of a common line as the intermediary transfer element, the first differential may for instance be $\Delta p_1 = p_1 - p_4$ or $\Delta p_1 = p_1 - p_3$ or $\Delta p_1 = p_3 - p_4$, and the second differential may for instance be $\Delta p_2 = p_3 - p_2$ or $\Delta p_2 = p_2 - p_4$ or $\Delta p_2 = p_1 - p_2$, respectively. In case of a heat exchanger as the intermediary transfer element, the primary side pressure is fully decoupled from the secondary side pressure, wherein the first differential may for instance be $\Delta p_1 = p_1 - p_2$ and the second differential may for instance be $\Delta p_2 = p_3 - p_4$. The signed deviation value may be $\Delta\Delta T = \Delta T_2 - \Delta T_1$ or $\Delta\Delta p = \Delta p_2 - \Delta p_1$.

The thermal transfer between the first port and the third port and/or the thermal transfer between the fourth port and the second port may be denoted as a thermal transfer "across" the intermediary transfer element, whereas the thermal transfer between the first port and the second/fourth port and/or the thermal transfer between the fourth port and the first/third port may be denoted as a thermal transfer "along" the intermediary transfer element. By adapting the flow(s), the thermal transfer across the intermediary transfer element may be maximized, whereas the thermal transfer along the intermediary transfer element may be minimized. The signed deviation value $\Delta\Delta T$ and/or $\Delta\Delta p$ may be correlated with the thermal transfer along the intermediary transfer element.

In case of a common line as the intermediary transfer element, a negative deviation value $\Delta\Delta T$ and/or $\Delta\Delta p$ may be representative for a flow along the common line from the fourth port to the third port. Such a "negative" flow is undesirable, because the "temperature lift" between the first port and third port would be reduced, resulting in an aggravation of a low $\Delta T$ syndrome. Analogously, a positive deviation value $\Delta\Delta T$ and/or $\Delta\Delta p$ may be representative for a flow along the common line from the first port to the second port. Such a "positive" flow is also undesirable, because the thermal capacity of the primary side is not fully used.

In case of a very efficient heat exchanger as the intermediary transfer element, a negative deviation value $\Delta\Delta T$ and/or $\Delta\Delta p$ may be representative for a lack of thermal transfer across the heat exchanger from the first port to the third port. This is undesirable, because the "temperature lift" between the first port and third port would be reduced, resulting in an aggravation of a low $\Delta T$ syndrome. Analogously, a positive deviation value $\Delta\Delta T$ and/or $\Delta\Delta p$ may be representative for an abundance of thermal transfer along the heat exchanger from the first port to the second port. Such a thermal transfer is also undesirable, because the thermal capacity of the primary side is not fully used.

Optionally, the signed deviation value may be a difference between a measured or determined flow q in a common line as the intermediary transfer element and a pre-determined common line reference flow, preferably a zero common line flow. For instance, a flow meter in the common line may provide a measured flow variable q. Alternatively or in addition, the flow in the common line may be determined by a pressure differential along the common line. For instance, a first pressure sensor may be placed between the first port and the third port and a second pressure sensor may be placed between the second port and the fourth port. After a calibration of the pressure differential between the two pressure sensors for zero flow, the pressure differential may be used as the signed deviation value. The primary/secondary flow(s) may be adapted to keep the flow in the common line to a minimum. There is no need for a check valve preventing a negative flow q from the fourth port to the third port.

Optionally, the signed deviation value may be a difference between a flow differential in a heat exchanger as the intermediary transfer element and a pre-determined reference heat exchanger differential flow, preferably a zero heat exchanger differential flow. For instance, a first flow meter in the primary side a may provide a first measured flow variable $q_1$ and a second flow meter in the secondary side a may provide a second measured flow variable $q_2$, wherein the signed deviation value may be a flow differential $\Delta q = q_1 - q_2$. The primary/secondary flow(s) may be adapted to keep the flow differential $\Delta q$ to a minimum.

Optionally, the flow control module may be configured to maintain a current primary side flow if the signed deviation value is between a negative reference value and a positive reference value, preferably essentially zero. The negative reference value and a positive reference value may be predetermined low values between which the thermal power transfer along the intermediary transfer element is sufficiently small, i.e. the thermal power transfer across the intermediary transfer element is sufficiently large. This situation may be regarded as a stable operation with the current primary side flow. The current secondary side flow may also be maintained. However, other control schemes, such as a building management system, a radiator thermostat or a manual AHU switch may open/close one or more load valves indicating a higher/lower demand for thermal power at a load element. Such other control schemes may command a higher/lower secondary side flow. For instance, an internal automatic pump controller of a secondary side pump may establish a corresponding target pressure/flow by increasing/decreasing the speed of the secondary side pump. Despite of a high thermal power demand, the control module disclosed herein may overrule such an underlying control scheme to decrease the secondary side flow for a minimum of the signed deviation value. However, as long as the signed deviation value is above the negative reference value, the flow control module may allow an internal automatic pump controller of a secondary side pump to increase the speed of the secondary side pump in order to establish a target pressure and flow in the secondary side to meet the thermal power demand of the load element.

Optionally, the flow control module may be configured to increase the primary side flow if the signed deviation value is below a negative reference value. In case of a common line, this undesirable "negative" flow spoiling the temperature lift across the common line is tackled by a higher thermal power supply to the intermediary transfer element via the first port. However, this increase of thermal power supply may be limited a maximum primary side pump speed, a maximum primary side valve opening and/or the maximum capacity of the source element(s). Therefore, the flow control module may be configured to maintain the primary side flow if the signed deviation value is below a negative reference value and the primary side flow is above a predetermined maximum threshold. The predetermined maximum threshold may be defined by a maximum primary side pump speed, a maximum primary side valve opening or a maximum capacity of the source element(s).

In one embodiment of the flow control module disclosed herein, only the primary side flow is controlled by the flow control module. As long as the signed deviation value is above a positive reference value, the flow control module decreases the primary side flow until a minimum primary side flow is reached. A minimum primary side flow may, for instance, be a predetermined value defined by the source element(s) that may require a minimal primary flow.

Optionally, the flow control module may be configured to maintain a current primary side flow if the signed deviation value is above a positive reference value and the flow in the primary side is below a predetermined minimum threshold. Such a situation may be denoted as a stable "low demand operation", wherein the thermal transfer along the intermediary transfer element between the first port and the second port is minimized.

In another embodiment of the flow control module disclosed herein, only secondary side flow is controlled by the flow control module. In yet another embodiment of the flow control module disclosed herein, both the primary and secondary side flows are controlled by the flow control module. If the secondary side flow is controllable by the flow control module, the flow control module may be configured to decrease the secondary side flow if the signed deviation value is below a negative reference value and the primary side flow cannot be increased. The increase of the primary side flow may be limited by a primary side pump already running at maximum speed, a primary side valve being already fully opened, or a maximum capacity of the source element(s). Another reason could be that the primary side flow may not be controllable by the flow control module in the first place. Such a decrease of the secondary side flow may be conflicting with an underlying internal automatic pump controller of a secondary side pump aiming for a target pressure and flow, because the secondary side flow is reduced when the thermal power demand of the load element(s) is not met by the thermal power supply of the source element(s). However, reducing the secondary side flow increases in this case the thermal power transfer across the intermediary transfer element from the first port to the third port. Thus, the load element(s) are provided with the maximum available thermal power by a reduced secondary side flow. Despite of a high thermal power demand in the secondary side, the flow control module overrules any underlying control scheme in order to decrease the secondary side flow for a minimum of the signed deviation value. However, as long as the signed deviation value is above the negative reference value, the flow control module may allow an internal automatic pump controller of a secondary side pump to increase the speed of the secondary side pump in order to establish a target pressure and flow in the secondary side to meet the thermal power demand of the load element.

Optionally, the flow control module may be integrated in one of the at least one controllable primary side flow actuator and/or one of the at least one controllable secondary side flow actuator. Alternatively, or in addition, the flow control module may be integrated in a cloud-based computer system and/or a building management system (BMS).

According to a second aspect of the present disclosure, a hydronic system is provided comprising
a primary side comprising at least one source element, a first port in fluid connection with an output of the at least one source element, a second port in fluid connection with an input of the at least one source element, and at least one controllable primary side flow actuator for providing a primary side flow, a secondary side comprising at least one load element, a third port in fluid connection with an input of the at least one load element, a fourth port in fluid connection with an output of the at least one load element, and at least one controllable secondary side flow actuator for providing a secondary side flow, an intermediary transfer element between the primary side and the secondary side, wherein the intermediary transfer element is in fluid connection with the first port, the second port, the third port and the fourth port, and a flow control module as disclosed herein.

Optionally, the hydronic system may further comprise a group of four sensors with a first sensor being arranged and configured to determine a first variable of fluid flowing through the first port, a second sensor being arranged and configured to determine a second variable of fluid flowing through the second port, a third sensor being arranged and configured to determine a third variable of fluid flowing through the third port, and a fourth sensor being arranged and configured to determine a fourth variable of fluid flowing through the fourth port. For instance, the group of sensors may be four temperature sensors, or four pressure sensors, preferably being installed at the four ports.

Optionally, the intermediary transfer element is a common line or a heat exchanger. In case of a common line being the intermediary transfer element, the hydronic system may further comprise a flow meter in the common line. In case of a heat exchanger being the intermediary transfer element, the hydronic system may further comprise a first flow meter in the primary side and a second flow meter in the secondary side.

Alternatively, or in addition, the at least one controllable primary side flow actuator and/or the at least one controllable secondary side flow actuator may be at least one primary/secondary side pump which is speed-controllable by means of the flow control module. Alternatively, the at least one controllable primary side flow actuator and/or the at least one controllable secondary side flow actuator may be at least one combination of a fixed-speed pump and a primary/secondary side valve, wherein the opening degree of the primary/secondary side valve is controllable by means of the flow control module.

According to a third aspect of the present disclosure, a method for controlling the flow in a hydronic system is provided, wherein the hydronic system comprises a primary side having a first port in fluid connection with an output of at least one source element, a second port in fluid connection with an input of at least one source element, and at least one controllable primary side flow actuator for providing a primary side flow, a secondary side having a third port in fluid connection with an input output of at least one load element, a fourth port in fluid connection with an output of at least one load element, and at least one controllable secondary side flow actuator for providing a secondary side flow, and an intermediary transfer element for transferring heat between the primary side and the secondary side, wherein the intermediary transfer element is in fluid connection with the first port, the second port, the third port and the fourth port, the method comprising adapting the thermal power transfer of the intermediary transfer element by controlling the primary side flow by means of the at least one controllable primary side flow actuator and/or the secondary side flow by means of the at least one controllable secondary side flow actuator in a continuous or regularly closed-loop manner based on minimizing a signed deviation value being correlated with the thermal power transfer of the intermediary transfer element.

Optionally, the signed deviation value may be a difference between a first differential and a second differential, wherein the first differential is a differential between any two measured variables of a group of four variables and the second differential is a differential between the other two measured variables of said group of four variables, wherein the group of four variables comprises a first variable of fluid flowing through the first port, a second variable of fluid flowing through the second port, a third variable of fluid flowing through the third port, and a fourth variable of fluid flowing through the fourth port.

Optionally, the first variable may be the temperature and/or pressure of fluid flowing through the first port, the second variable is the temperature and/or pressure of fluid flowing through the second port, the third variable is the temperature and/or pressure of fluid flowing through the third port, and the fourth variable is the temperature and/or pressure of fluid flowing through the fourth port.

Optionally, the signed deviation value may be a difference between a measured flow in a common line as the intermediary transfer element and a pre-determined common line reference flow, preferably a zero common line flow. Alternatively, a flow in a common line may be determined by a pressure differential along the intermediary transfer element between a first pressure sensor placed between the first port and the third port and a second pressure sensor placed between the second port and fourth port. Such a pressure differential may be calibrated for zero flow and then be used as the signed deviation value.

Optionally, the signed deviation value may be a difference between a flow differential in a heat exchanger as the intermediary transfer element and a pre-determined reference heat exchanger differential flow, preferably a zero heat exchanger differential flow. The flow differential being used as the signed deviation value may be the difference between the primary side flow and the secondary side flow.

Optionally, a current primary side flow may be maintained if the signed deviation value is between a negative reference value and a positive reference value, preferably essentially zero.

Optionally, the primary side flow may be increased if the signed deviation value is below a negative reference value.

Optionally, the primary side flow may be maintained if the signed deviation value is below a negative reference value and the primary side flow is above a predetermined maximum threshold.

Optionally, the secondary side flow may be decreased if the signed deviation value is below a negative reference value and the primary side flow cannot be increased.

Optionally, the primary side flow may be decreased if the signed deviation value is above a positive reference value.

Optionally, a current primary side flow may be maintained if the signed deviation value is above a positive reference value and the flow in the primary side is below a predetermined minimum threshold.

The method disclosed herein may be implemented in form of compiled or uncompiled software code that is stored on a computer readable medium with instructions for executing the method. Alternatively, or in addition, the method may be executed by software in a cloud-based system and/or a building management system (BMS), e.g. in the flow control module disclosed herein.

DETAILED DESCRIPTION

Figure 1:
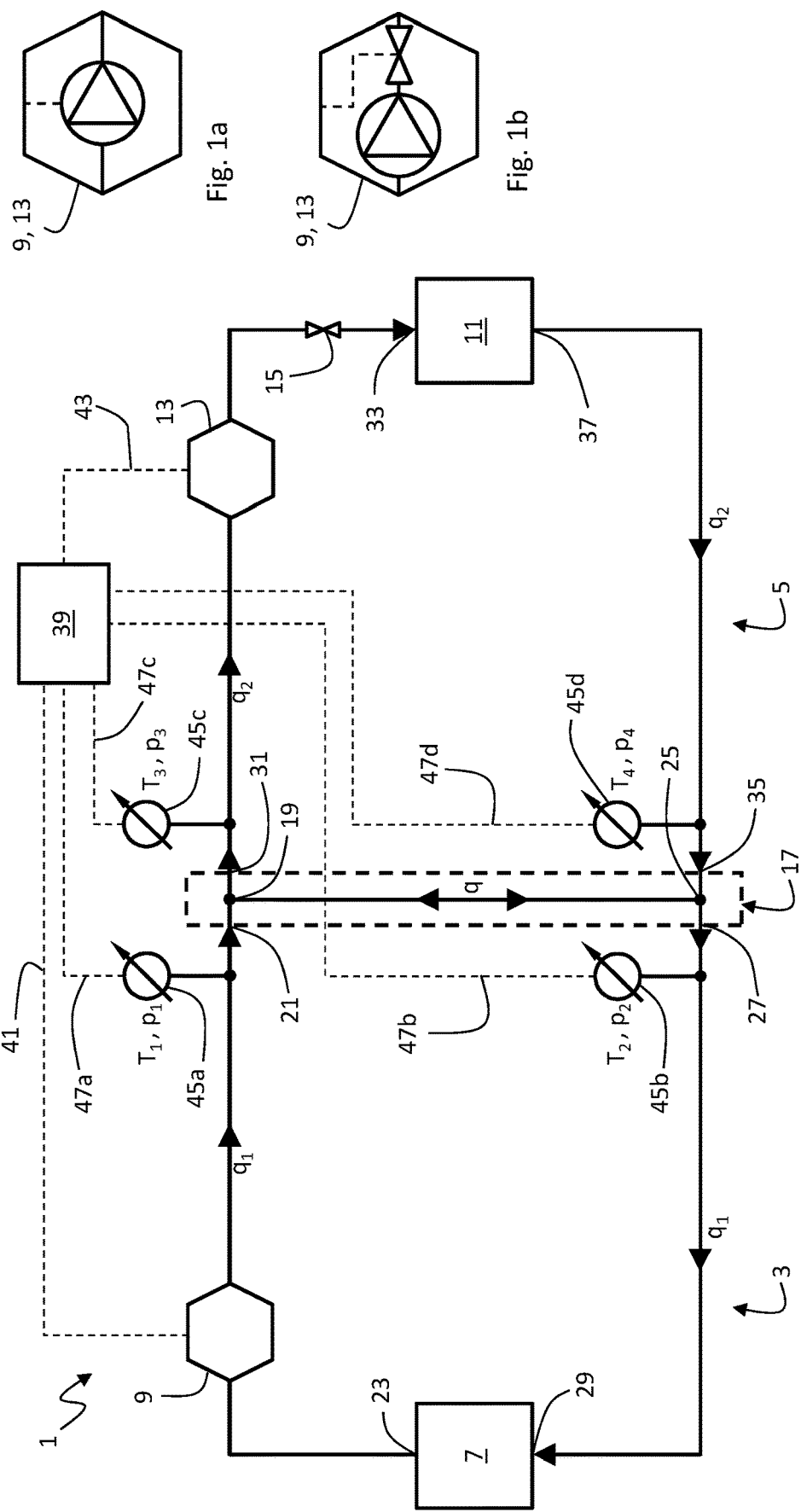
FIG. 1 is a schematic view of an example of an embodiment of a hydronic system according to the present disclosure.

FIG. 1 shows a hydronic system 1 having a primary side 3 and a secondary side 5. The hydronic system 1 can be a heating or cooling system. The primary side 3 comprises a source element 7, which may for instance be a heater, chiller, a heat exchanger or a common line coupling. The source element 7 provides thermal power by heating up or chilling down a fluid circulating in the primary side 3. The fluid may be water or a coolant with high thermal capacity. The fluid is driven through the primary side 3 by a controllable primary side flow actuator 9 for providing a primary side flow $q_1$. The secondary side 5 comprises a load element 11, which may for instance be a radiator or an air handling unit (AHU). The load element 11 consumes thermal power provided by the fluid circulating in the secondary side 5 and provides it to a place or object in need for thermal power. The fluid is driven through the secondary side 5 by a controllable secondary side flow actuator 13 for providing a secondary side flow $q_2$. The secondary side 5 comprises a load valve 15, which may be a motorized valve, a balancing valve, a check valve, a thermostat or another valve to limit the flow in the secondary side 5. FIG. 1a shows an embodiment wherein the controllable primary side flow actuator 9 and/or the controllable secondary side flow actuator 13 are speed-controllable pump(s). FIG. 1b shows an alternative embodiment wherein the controllable primary side flow actuator 9 and/or the controllable secondary side flow actuator 13 are fixed-speed pump(s) in combination with controllable valve(s).

The hydronic system 1 further comprises an intermediary transfer element 17 in form of a common line (or hydraulic separator or tank) between the primary side 3 and the secondary side 5. A first T-end 19 of the intermediary transfer element 17 is connected to a first port 21 of the primary side 3, the first port 21 being in fluid connection with an output 23 of the source element 7. A second T-end 25 of the intermediary transfer element 17 is connected to a second port 27 of the primary side 3, the second port 27 being in fluid connection with an input 29 of the source element 7. The first T-end 19 of the intermediary transfer element 17 connects the first port 21 of the primary side 3 with a third port 31 of the secondary side 5, the third port 31 being in fluid connection with an input 33 of the load element 11. The second T-end 25 of the intermediary transfer element 17 connects the second port 27 of the primary side 3 with a fourth port 35 of the secondary side 5, the fourth port 35 being in fluid connection with an output 37 of the load element 11.

In principle, the intermediary transfer element 17 in form of a common line allows for a fluid flow (downward in FIGS. 1, 4 and 5) from the first port 21 of the primary side 3 to the second port 27 of the primary side 3. Such a "positive" primary side flow downward along the common line may for instance be required when the thermal power demand of the load element 11 is low and the load valve 15 is closed. Likewise, the intermediary transfer element 17 also allows for a fluid flow (upward in FIGS. 1, 4 and 5) from the fourth port 35 of the secondary side 5 to the third port 31 of the secondary side 5. Such a "negative" secondary side flow upward along the common line may for instance be required when the thermal power supply by the primary side 3 is exceeded by a high thermal power demand of the load element 11 with the load valve 15 being fully opened. However, despite the principle possibility for a positive and negative flow through the common line, a flow through the common line is not desirable, because a negative flow aggravates a low ΔT syndrome and a positive flow does not efficiently use the thermal power capacity of the source element 7.

Therefore, in order to minimize the flow in the common line, the hydronic system 1 comprises a flow control module 39 for controlling the primary side flow $q_1$ and/or the secondary side flow $q_2$. The flow control module 39 may be integrated in the controllable primary side flow actuator 9 and/or the controllable secondary side flow actuator 13. Alternatively, or in addition, the flow control module 39 may be integrated in a cloud-based computer system and/or a building management system (BMS). The flow control module 39 may control the primary/secondary side flow $q_{1,2}$ by means of controlling the speed of a speed-controllable primary/secondary side pump (see FIG. 1a) and/or by controlling the opening degree of a controllable primary/secondary side valve in combination with a fixed-speed primary/secondary side pump (see FIG. 1b).

The flow control module 39 may have a wired or wireless first signal connection 41 with the controllable primary side flow actuator 9 and/or a wired or wireless second signal connection 43 with the controllable secondary side flow actuator 13. If the secondary side flow $q_2$ is not controllable by the flow control module 39, the second signal connection 43 is not needed (in FIGS. 1 to 6). Likewise, if the primary side flow $q_1$ is not controllable by the flow control module 39, the first signal connection 41 is not needed (in FIGS. 1 to 6). For instance, either the controllable primary side flow actuator 9 or the controllable secondary side flow actuator 13 may comprise a fixed-speed pump without a controllable primary/secondary side valve. However, in the examples shown in FIGS. 1 to 6, both the primary side flow $q_1$ and the secondary side flow $q_2$ are controllable by means of the flow control module 39.

The hydronic system 1 as shown in FIG. 1 further comprises a group of four sensors 45a-d with a first temperature or pressure sensor 45a being arranged and configured to determine the temperature $T_1$ or pressure $p_1$ of the fluid flowing through the first port 21, a second temperature or pressure sensor 45b being arranged and configured to determine the temperature $T_2$ or pressure $p_2$ of the fluid flowing through the second port 27, a third temperature or pressure sensor 45c being arranged and configured to determine the temperature $T_3$ or pressure $p_3$ of the fluid flowing through the third port 31, and a fourth temperature or pressure sensor 45d being arranged and configured to determine the temperature $T_4$ or pressure $p_4$ of the fluid flowing through the fourth port 35. Each of the sensors 45a-d has a wired or wireless signal connection 47a-d with the flow control module 39. The flow control module 39 receives the respective measured temperatures or pressures via the signal connections 47a-d. The sensors 45a-d may alternatively be signal connected with the flow control module 39 via a data bus.

The flow control module 39 is configured to continuously or regularly monitor the measured temperatures $T_{1-4}$ or pressures $p_{1-4}$ in order to control the flow(s) $q_1$, $q_2$ in a continuous or regularly closed-loop manner based on minimizing a signed deviation value $\Delta\Delta T$ or $\Delta\Delta P$ being correlated with the thermal power transfer of the intermediary transfer element 17. The signed deviation value $\Delta\Delta T$ or $\Delta\Delta P$ may be determined by the flow control module 39 and may be a difference between a first differential $\Delta T_1$ or $\Delta p_1$ and a second differential $\Delta T_2$ or $\Delta p_2$. In case of sensors 45a-d being temperature sensors, the first differential may for instance be $\Delta T_1 = T_1 - T_4$ or $\Delta T_1 = T_1 - T_3$ or $\Delta T_1 = T_3 - T_4$, and the second differential may for instance be $\Delta T_2 = T_3 - T_2$ or $\Delta T_2 = T_2 - T_4$ or $\Delta T_2 = T_1 - T_2$, respectively. Analogously, in case of a common line being the intermediary transfer element 17 (see FIGS. 1, 4 and 5) and the sensors 45a-d being pressure sensors, the first differential may for instance be $\Delta p_1 = p_1 - p_4$ or $\Delta p_1 = p_1 - p_3$ or $\Delta p_1 = p_3 - p_4$, and the second differential may for instance be $\Delta p_2 = p_3 - p_2$ or $\Delta p_2 = p_2 - p_4$ or $\Delta p_2 = p_1 - p_2$, respectively. In case of a heat exchanger being the intermediary transfer element 17 (see FIGS. 2, 3 and 6) and the sensors 45a-d being pressure sensors, the primary side pressure is fully decoupled from the secondary side pressure, wherein the first differential may for instance be $\Delta p_1 = p_1 - p_2$ and the second differential may for instance be $\Delta p_2 = p_3 - p_4$. The signed deviation value may be $\Delta\Delta T = \Delta T_2 - \Delta T_1$ or $\Delta\Delta p = \Delta p_2 - \Delta p_1$.

The current primary side flow $q_1$ is maintained by the flow control module 39 if the signed deviation value $\Delta\Delta T$ or MAP is between a negative reference value and a positive reference value, preferably essentially zero. The negative reference value and a positive reference value may define a band around zero, within which a fluid flow q through the common line is sufficiently low. In other words, the thermal power transfer along the intermediary transfer element 17 (upward between the fourth port 35 and the third port 31 or downward between the first port 21 and the second port 27) is minimal, whereas the thermal power transfer across the intermediary transfer element 17 (from the first port 21 to the third port 31 and from the fourth port 35 to the second port 27) is maximal. This is a stable and desirable operation of the hydronic system 1.

Once the signed deviation value $\Delta\Delta T$ or $\Delta\Delta P$ falls below the negative reference value, however, a negative flow q upward along the common line is indicated. If the flow control module 39 is able to control the primary side flow $q_1$, the flow control module 39 immediately reacts to such a feedback in a closed-loop manner by increasing the primary side flow $q_1$. As a consequence, the negative deviation value $\Delta\Delta T$ or $\Delta\Delta P$ should rise above the negative reference value, i.e. the negative flow q upward along the common line should reduce or stop. A stable and desirable operation at a higher primary side flow $q_1$ may thus be established.

If the negative deviation value $\Delta\Delta T$ or $\Delta\Delta P$ does not rise above the negative reference value, the primary side flow $q_1$ is increased until it cannot be increased anymore, e. g. when a maximum primary side pump speed or maximum primary side valve opening is reached, or until the primary side flow $q_1$ has reached a predetermined maximum threshold $q_{max}$. In this situation and in case the primary side flow $q_1$ is not controllable by the flow control module 39 in the first place, the secondary side flow $q_2$ is decreased. It should be noted that such a decrease may seem counter-intuitive, because the load element 11 demands more thermal power than it gets through the fully opened load valve 15. Normally, an internal automatic secondary side pump controller would react with an increase of speed to an opening of the load valve 15 in order to establish a target pressure and flow in the secondary side 5. However, the flow control module 39 may overrule such an internal automatic secondary side pump controller and may command a decrease of the secondary side flow $q_2$ in case of a negative common line flow q in order to maximize the available thermal power transfer across the intermediary transfer element 17. In this situation, the supply of thermal power by the primary side 3 is either at its maximum or uncontrollable by the flow control module 39. As long as the signed deviation value $\Delta\Delta T$ or $\Delta\Delta P$ is above the negative reference value, the flow control module 39 may allow an internal automatic secondary side pump controller to increase the secondary side flow $q_2$ in order to establish a target pressure and flow in the secondary side 5 to meet the thermal power demand of the load element 11 indicated by the opened load valve 15.

In case the load element 11 has a low demand for thermal power and the load valve 15 is at least partly closed, for instance, the situation may occur that the signed deviation value $\Delta\Delta T$ or $\Delta\Delta P$ rises above the positive reference value, which indicates a positive flow q downward along the common line. If the flow control module 39 is able to control the primary side flow $q_1$, the flow control module 39 immediately reacts to such a feedback in a closed-loop manner by decreasing the primary side flow $q_1$. As a consequence, the positive deviation value $\Delta\Delta T$ or $\Delta\Delta P$ should fall below the positive reference value, i.e. the positive flow q downward along the common line should reduce or stop. A stable and desirable operation at a lower primary side flow $q_1$ may thus be established.

If the positive deviation value $\Delta\Delta T$ or $\Delta\Delta P$ does not fall below the positive reference value, the primary side flow $q_1$ is decreased until it cannot be decreased anymore, e.g. when a minimum primary side pump speed or minimum primary side valve opening is reached, or until the primary side flow $q_1$ has reached a predetermined minimum threshold $q_{min}$. Once a minimum primary side flow $q_1 = q_{min}$ is reached, the primary side flow $q_1$ is maintained and a stable low demand operation is established with a minimal acceptable positive flow q downward along the common line.

Figure 2:
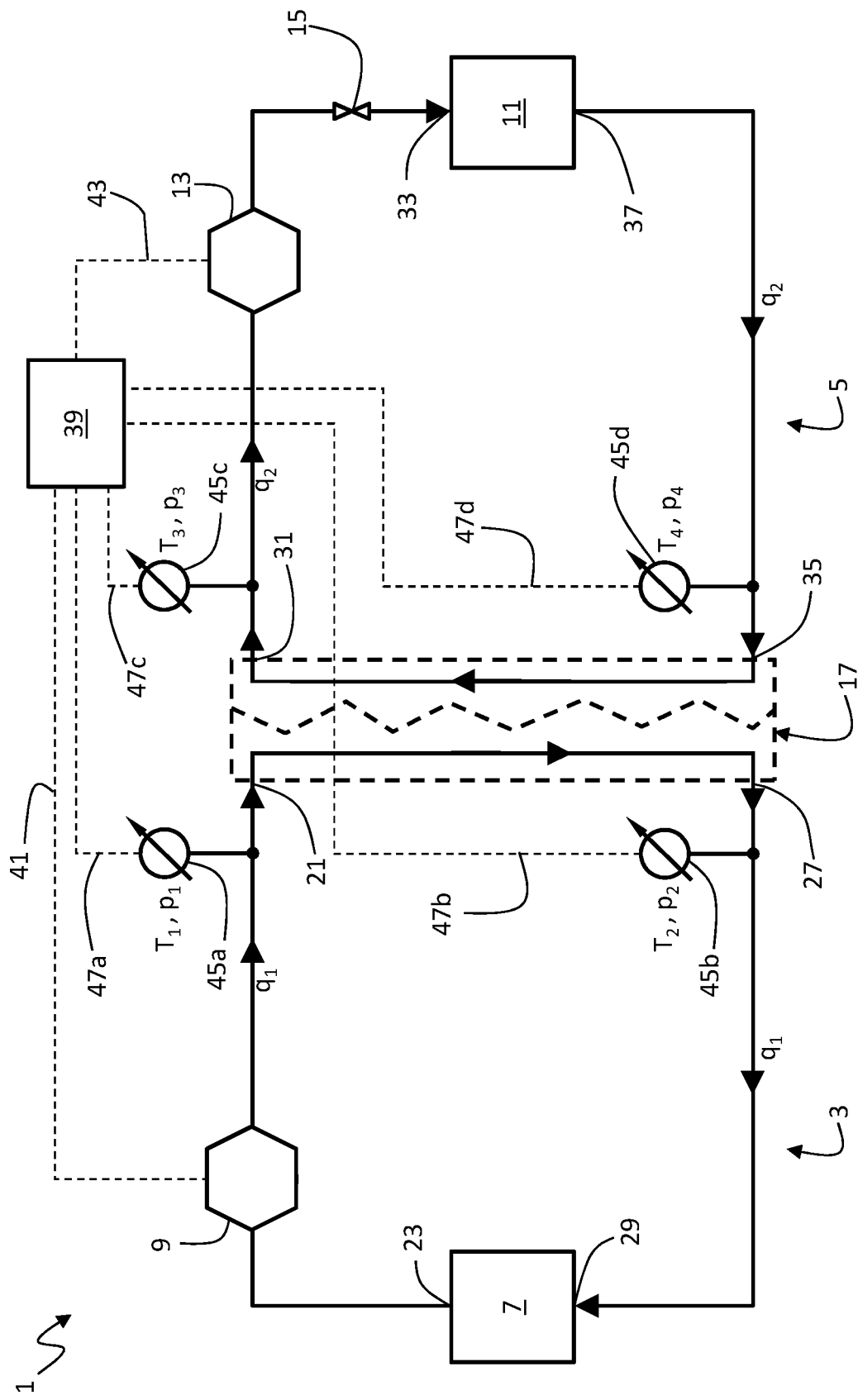
FIG. 2 is a schematic view of an example of another embodiment of a hydronic system according to the present disclosure.

FIG. 2 shows an embodiment with the intermediary transfer element 17 being a counter-flow heat exchanger. The primary side 3 and the secondary side 5 are completely decoupled in terms of pressure. There may even be different fluids running through the primary side 3 and the secondary side 5, because there is no mixing between the primary side 3 and the secondary side 5. The controlling of the flow actuator(s) 9, 13 is identical to FIG. 1. The flow control module 39 may not even be able to distinguish whether the intermediary transfer element 17 is a common line or a very efficient heat exchanger.

Figure 3:
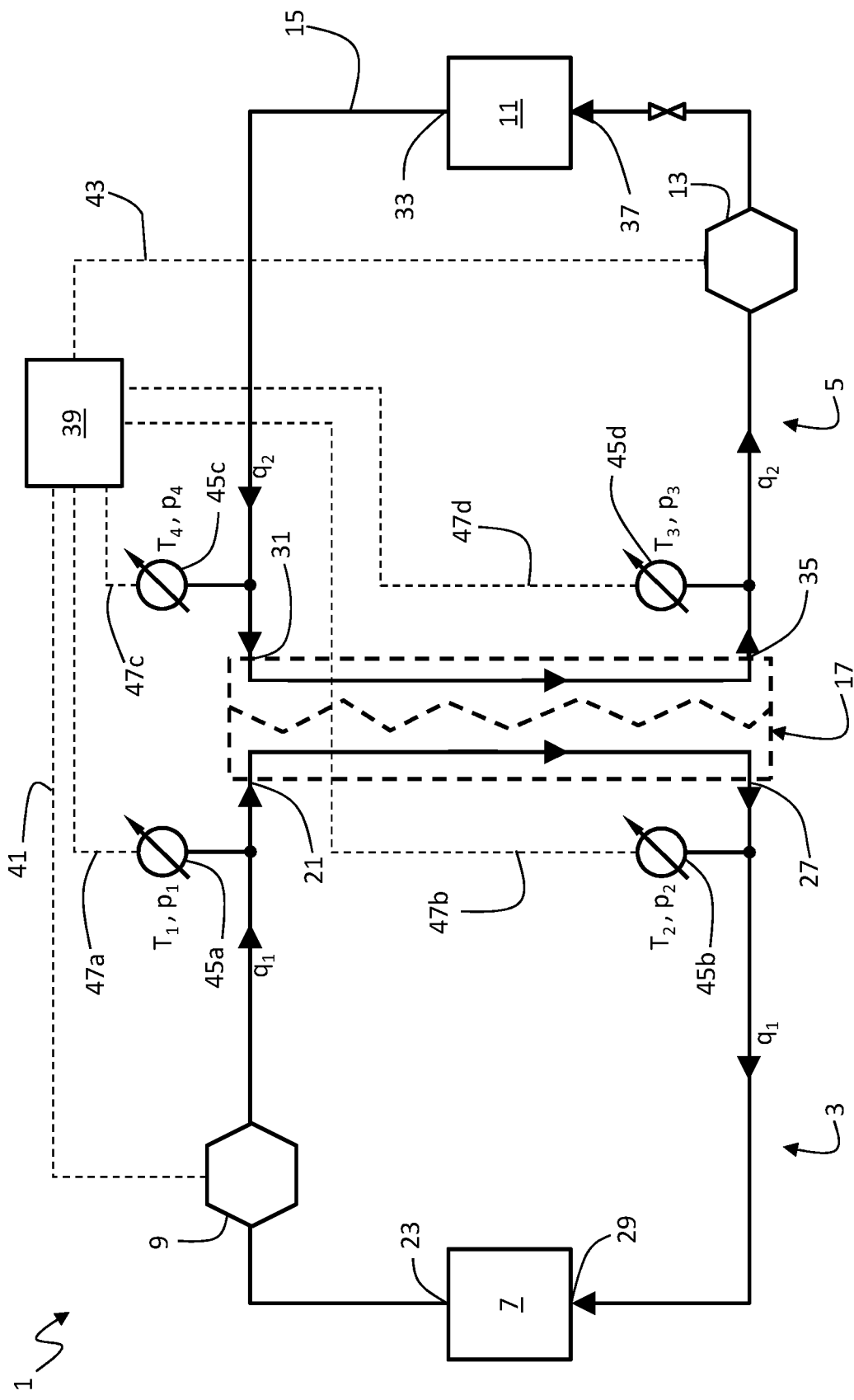
FIG. 3 is a schematic view of an example of yet another embodiment of a hydronic system according to the present disclosure.

FIG. 3 shows an embodiment with the intermediary transfer element 17 being a parallel-flow heat exchanger. The only difference is the direction of the secondary side flow $q_2$, so the position of the third port 31 and the third sensor 45c is swapped with the position of the fourth port 35 and the fourth sensor 45d. The controlling of the flow actuator(s) 9, 13 is identical to FIGS. 1 and 2.

Figure 4:
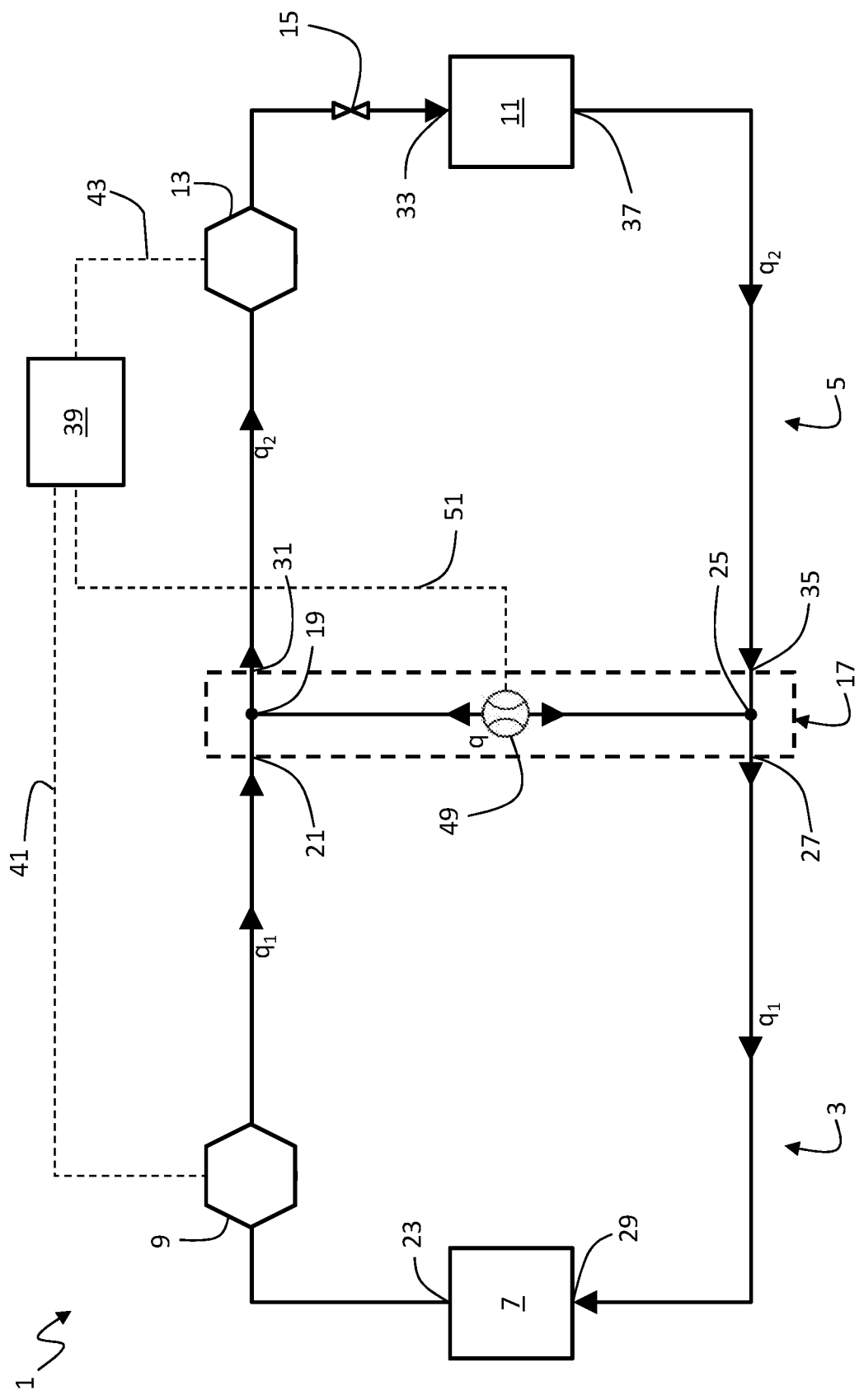
FIG. 4 is a schematic view of an example of yet another embodiment of a hydronic system according to the present disclosure.

FIG. 4 shows an embodiment with the intermediary transfer element 17 again being a common line or a hydraulic separator or a tank. However, instead of the group of four temperature or pressure sensors 45a-d, just one bi-directional flow meter 49 is installed in the common line for measuring the flow q along the common line. The flow control module 39 is signal connected to the flow meter 49 via a wired or wireless signal connection 51 for receiving the measured common line flow. The common line flow q is then used as the signed deviation value to be minimized. With the measured common line flow q being the signed deviation value, the controlling of the flow(s) $q_1$, $q_2$ is identical to FIGS. 1 to 3.

Figure 5:
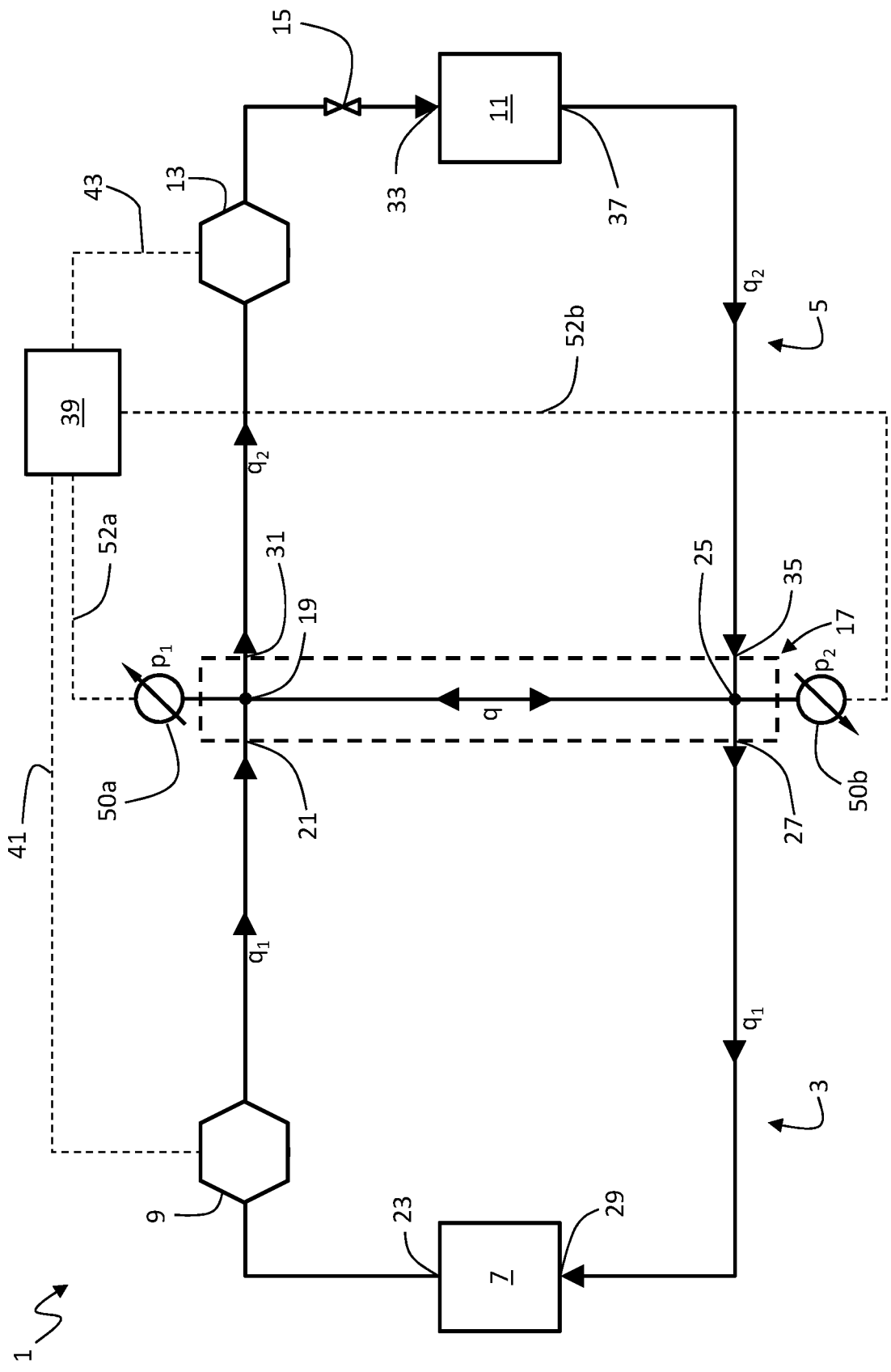
FIG. 5 is a schematic view of an example of yet another embodiment of a hydronic system according to the present disclosure.

FIG. 5 shows an embodiment similar to FIG. 4, wherein the common line flow q is not measured by a flow meter, but determined from a pressure differential along the common line. Therefore, a first pressure sensor 50a is located at the first T-end 19 of the intermediary transfer element 17 between the first port 21 of the primary side 3 and the third port 31 of the secondary side 5. The flow control module 39 is signal connected to the first pressure sensor 50a via a wired or wireless signal connection 52a for receiving a first pressure value $p_1$. A second pressure sensor 50b is located at the second T-end 25 of the intermediary transfer element 17 between the second port 27 of the primary side 3 and the fourth port 35 of the secondary side 5. The flow control module 39 is signal connected to the second pressure sensor 50b via a wired or wireless signal connection 52b for receiving a second pressure value $p_2$. Once the pressure differential $\Delta p = p_1 - p_2$ is determined by the flow control module 39 and calibrated for zero flow q, it can be used as the signed deviation value. With the pressure differential $\Delta p$ being the signed deviation value, the controlling of the flow(s) $q_1$, $q_2$ is identical to FIGS. 1 to 4.

Figure 6:
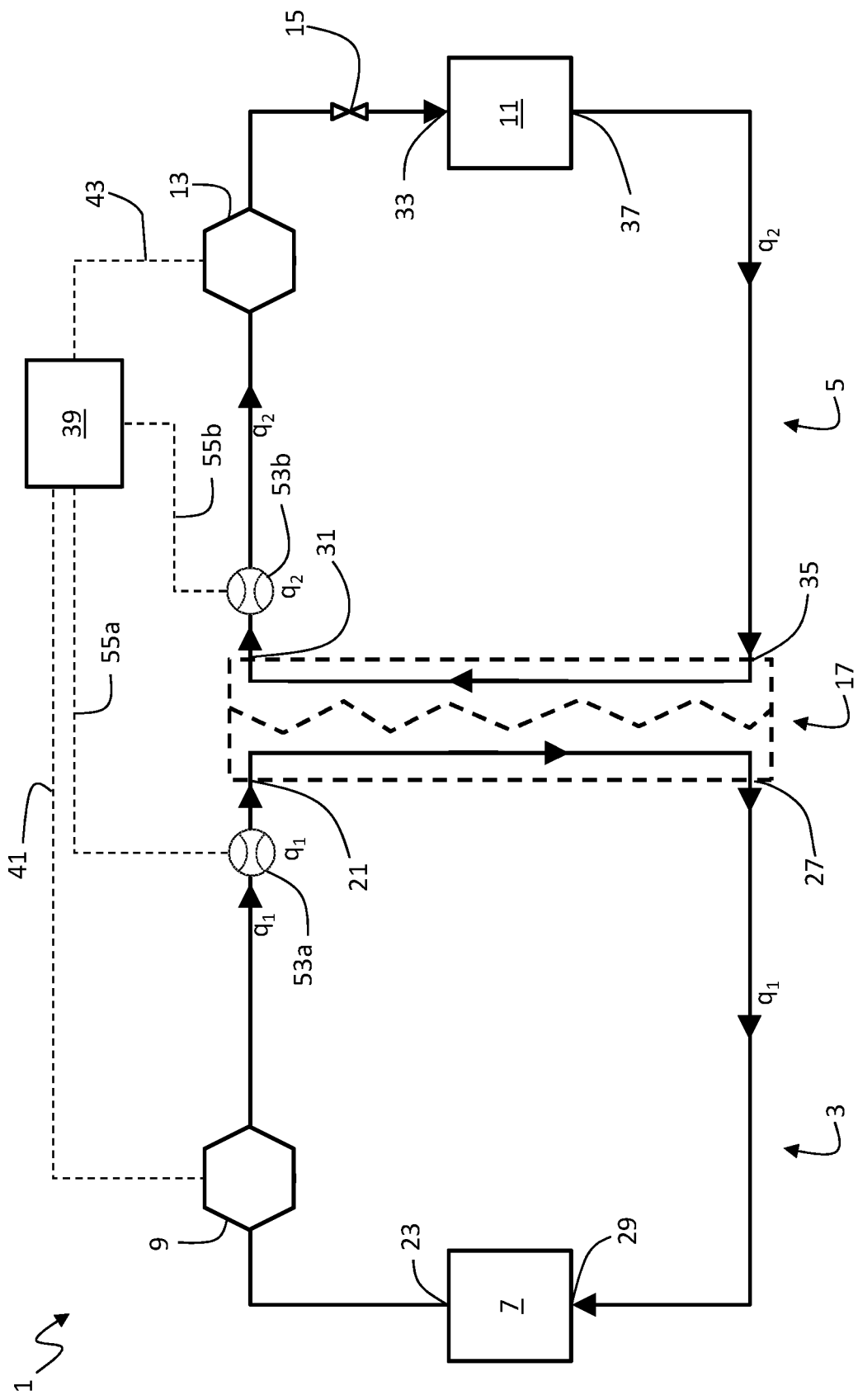
FIG. 6 is a schematic view of an example of yet another embodiment of a hydronic system according to the present disclosure.

FIG. 6 shows an embodiment with the intermediary transfer element 17 again being a counter-flow heat exchanger. However, instead of the group of four temperature or pressure sensors 45a-d, a first flow meter 53a is installed in the primary side 3 for measuring the primary side flow $q_1$ and a second flow meter 53b is installed in the secondary side 5 for measuring the secondary side flow $q_2$. The flow control module 39 is signal connected to the flow meters 53a,b via wired or wireless signal connections 55a,b, respectively, for receiving the measured flows $q_1$, $q_2$. The flow control module 39 determines a flow differential $\Delta q = q_1 - q_2$ and uses the flow differential $\Delta q$ as the signed deviation value to be minimized. With the flow differential $\Delta q$ being the signed deviation value, the controlling of the flow(s) $q_1$, $q_2$ is identical to FIGS. 1 to 5.

Figure 7:
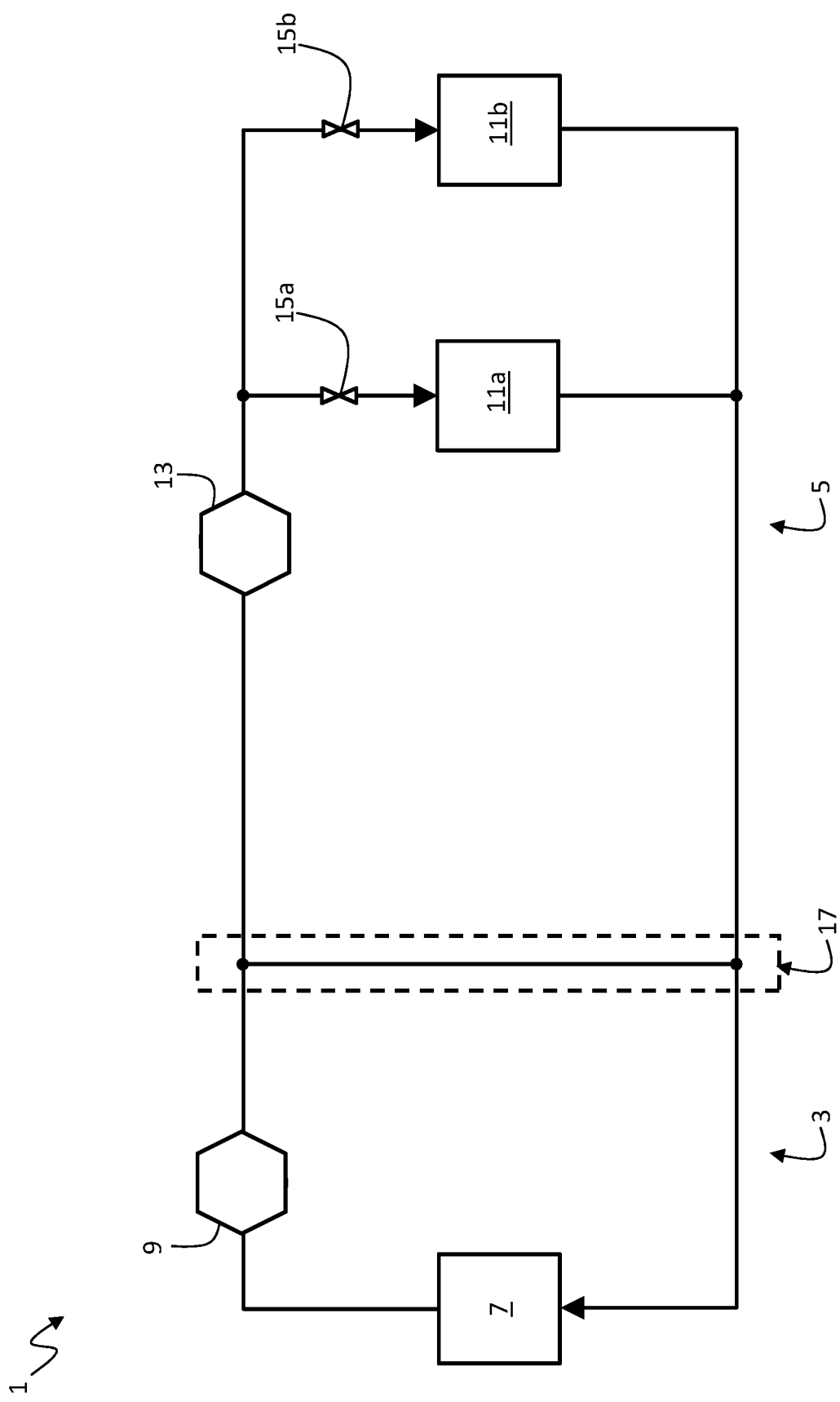
FIG. 7 is a schematic view of an example of yet another embodiment of a hydronic system according to the present disclosure.
Figure 8:
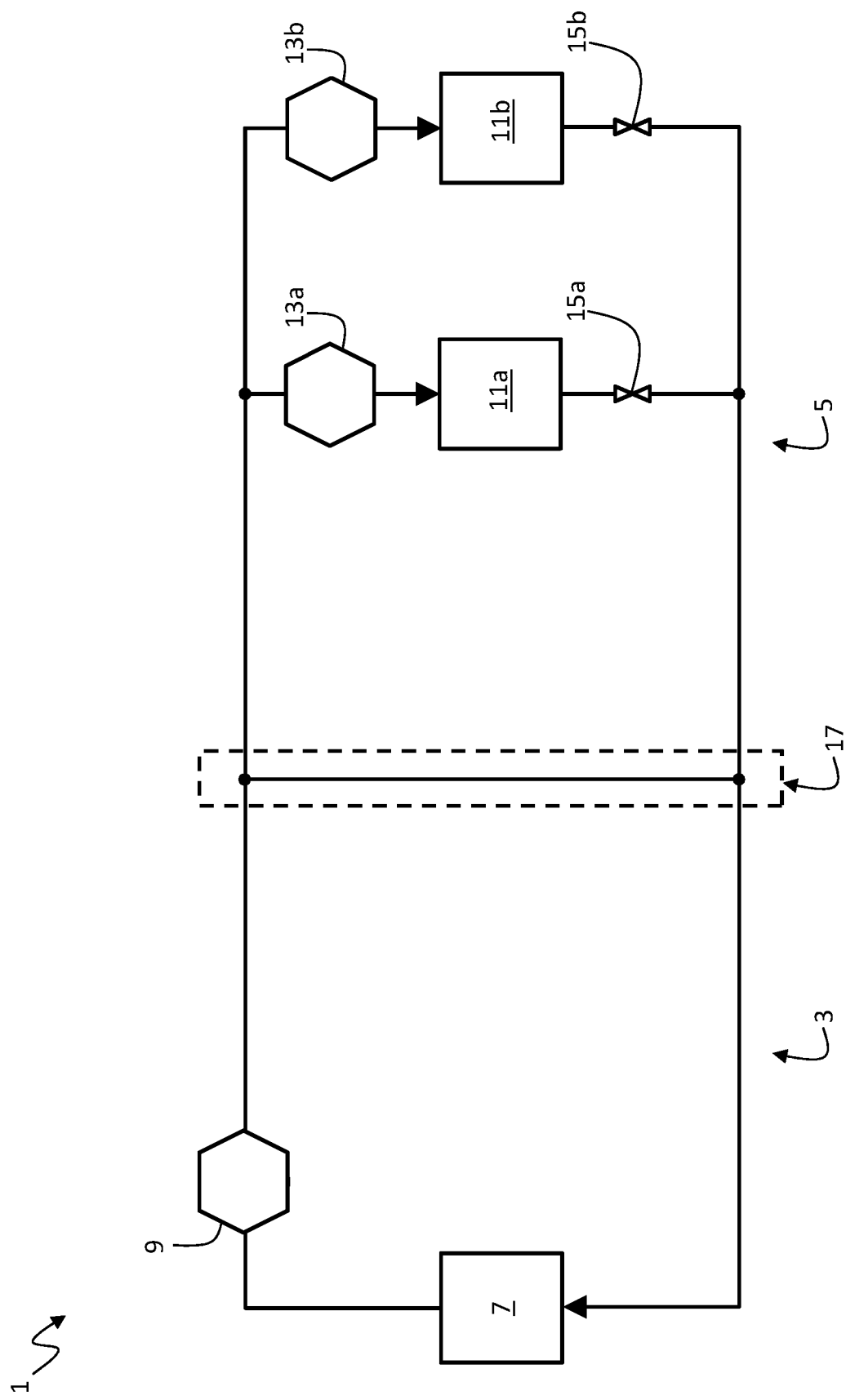
FIG. 8 is a schematic view of an example of yet another embodiment of a hydronic system according to the present disclosure.
Figure 9:
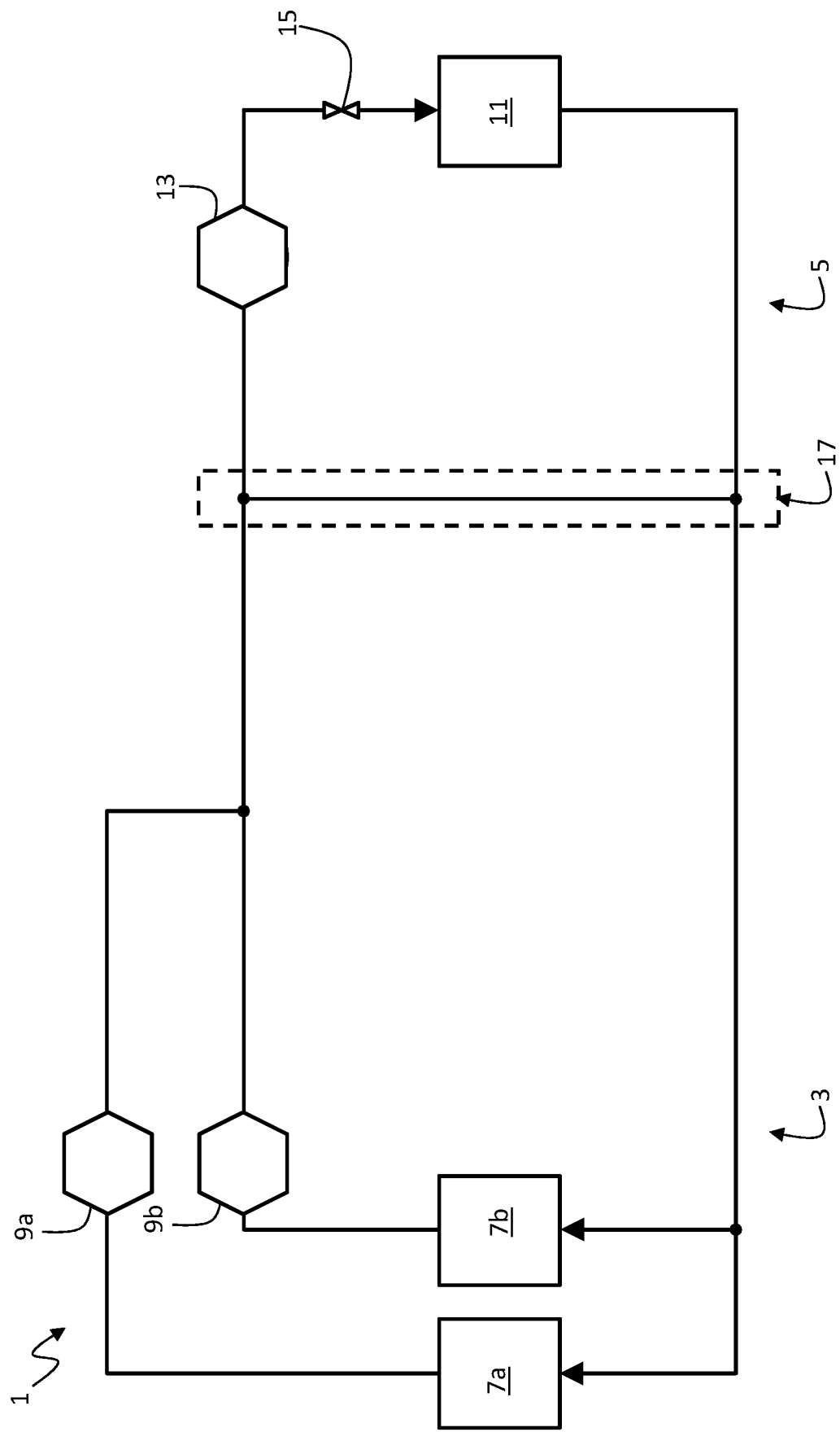
FIG. 9 is a schematic view of an example of yet another embodiment of a hydronic system according to the present disclosure.

In FIGS. 7 to 9, the control module 39, the signal connections 45a-d, 51, 52a,b, 55a,b and the sensors 45a-d, 49, 50a,b, 53a,b are not shown and the intermediary transfer element 17 is only shown as a common line for simplicity. It should be understood that any of the embodiments shown in FIGS. 1 to 6 are applicable to any hydronic system topology shown in FIGS. 7 to 9. The topology of the hydronic system 1 shown in FIG. 7 shows a plurality of two load elements 11a,b in parallel in the secondary side 5. Here, just one controllable secondary side flow actuator 13 drives the secondary side flow through both load elements 11. At least one valve 15a,b is associated with each load element 11a,b for restricting the secondary side flow through the respective load element 11a,b.

The system topology shown in FIG. 8 comprises a plurality of two parallel controllable secondary side flow actuators 13a,b, each of which is associated with a load element 11a,b. There are several options for controlling the respective secondary side flows through the load elements 11a,b. A first option would be controlling the primary side flow $q_1$ only as described above for FIGS. 1 to 6. If the primary side flow $q_1$ is uncontrollable by the flow control module 39 or if it has reached a maximum, the secondary side flows through the load elements 11a,b may be decreased to avoid a negative upward common line flow. The adaptation of the secondary side flows through the respective load elements 11a,b may be performed in different ways. One option would be a simultaneous decrease by the same absolute amount or the same relative amount with respect to the current secondary side flow. Another option would be to reduce only a highest of the secondary side flows, for instance only the fastest running half of speed-controllable secondary side pumps.

The system topology shown in FIG. 9 comprises a plurality of two parallel controllable primary side flow actuators 9a,b, each of which is associated with a source element 7a,b. There are again several options for controlling the primary side flows. A first option would be controlling the secondary side flow $q_2$ only as described above for FIGS. 1 to 6. If the secondary side flow $q_2$ is uncontrollable by the flow control module 39 or if it has reached a minimum or if the signed deviation value is above the positive reference value indicating a positive downward common line flow, the primary side flows may be decreased to reduce the positive downward common line flow to a minimum. In case of a signed deviation value being below the negative reference value indicating a negative upward common line flow, the primary side flows may be increased to avoid or reduce the negative upward common line flow. The adaptation of the respective primary side flows through the source elements 7a,b may be performed in different ways. One option would be a simultaneous adaptation by the same absolute amount or the same relative amount with respect to the current primary side flow. Another option would be to operate as many of the controllable primary side flow actuators 9a,b with a minimum in terms of energy consumption of the associated source element 11a,b, and to adapt only as few as possible primary side flows provided by the controllable primary side flow actuators 9a,b.

Figure 10:
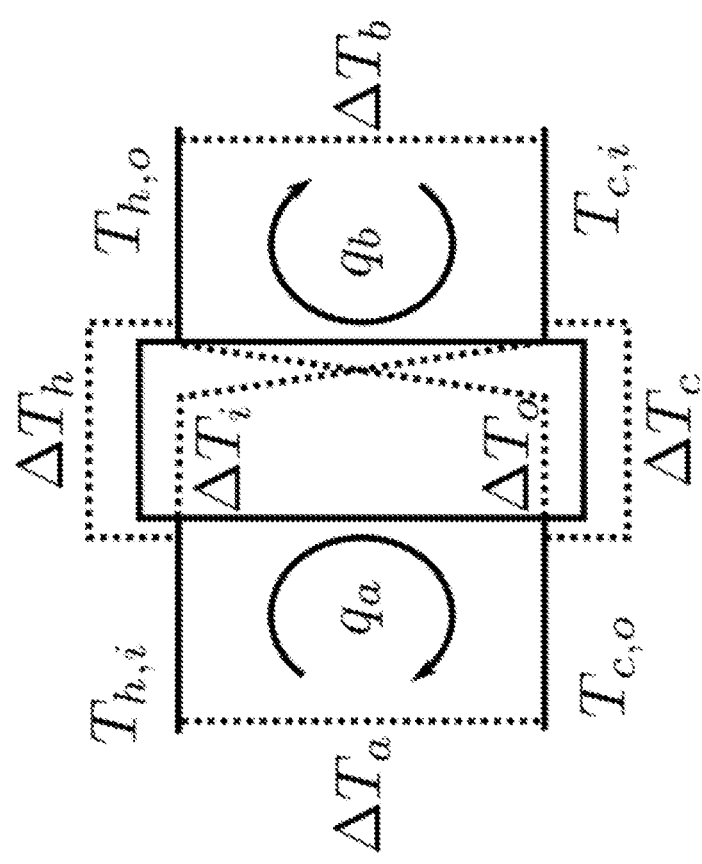
FIG. 10 is a schematic view of an example of an embodiment of an intermediary transfer element hydronic system according to the present disclosure.

FIG. 10 explains schematically the relations between the temperatures at the four ports 21, 27, 31, 35 to the intermediary transfer element 17. The intermediary transfer element 17 may be a common line, a hydraulic separator, a tank or a counter-flow heat exchanger. The hydronic system 1 is here a heating system. The temperature $T_1$ at the first port 21 is denoted as $T_{h,l}$ in the sense of hot feed input into the intermediary transfer element 17. The temperature $T_2$ at the second port 27 is denoted as $T_{c,o}$ in the sense of cold return output of the intermediary transfer element 17. The temperature $T_3$ at the third port 31 is denoted as $T_{h,o}$, as hot feed output of the intermediary transfer element 17. The temperature $T_4$ at the fourth port 35 is denoted as $T_{c,i}$ in the sense of cold return input into the intermediary transfer element 17. The following relations apply:

$$\Delta T_h = T_{h,i} - T_{h,o}$$

$$\Delta T_c = T_{c,o} - T_{c,i}$$

$$\Delta T_i = T_{h,i} - T_{c,i}$$

$$\Delta T_o = T_{h,o} - T_{c,o}$$

$$\Delta T_a = T_{h,i} - T_{c,o}$$

$$\Delta T_b = T_{h,o} - T_{c,i}$$

$$\Delta T_c - \Delta T_i + \Delta T_b - \Delta T_o = 0$$

$$\Delta T_a - \Delta T_h + \Delta T_b - \Delta T_c = 0$$

$$\Delta \Delta T = \Delta T_o - \Delta T_i = \Delta T_c - \Delta T_h = \Delta T_a - \Delta T_b,$$

wherein $\Delta\Delta T = \Delta T_2 - \Delta T_1$ may be the signed deviation value to be minimized. It shows that the first temperature differential $\Delta T_1$ may be $\Delta T_i$, $\Delta T_h$ or $\Delta T_b$ and the second temperature differential may be $\Delta T_o$, $\Delta T_c$ or $\Delta T_a$.

Figure 11:
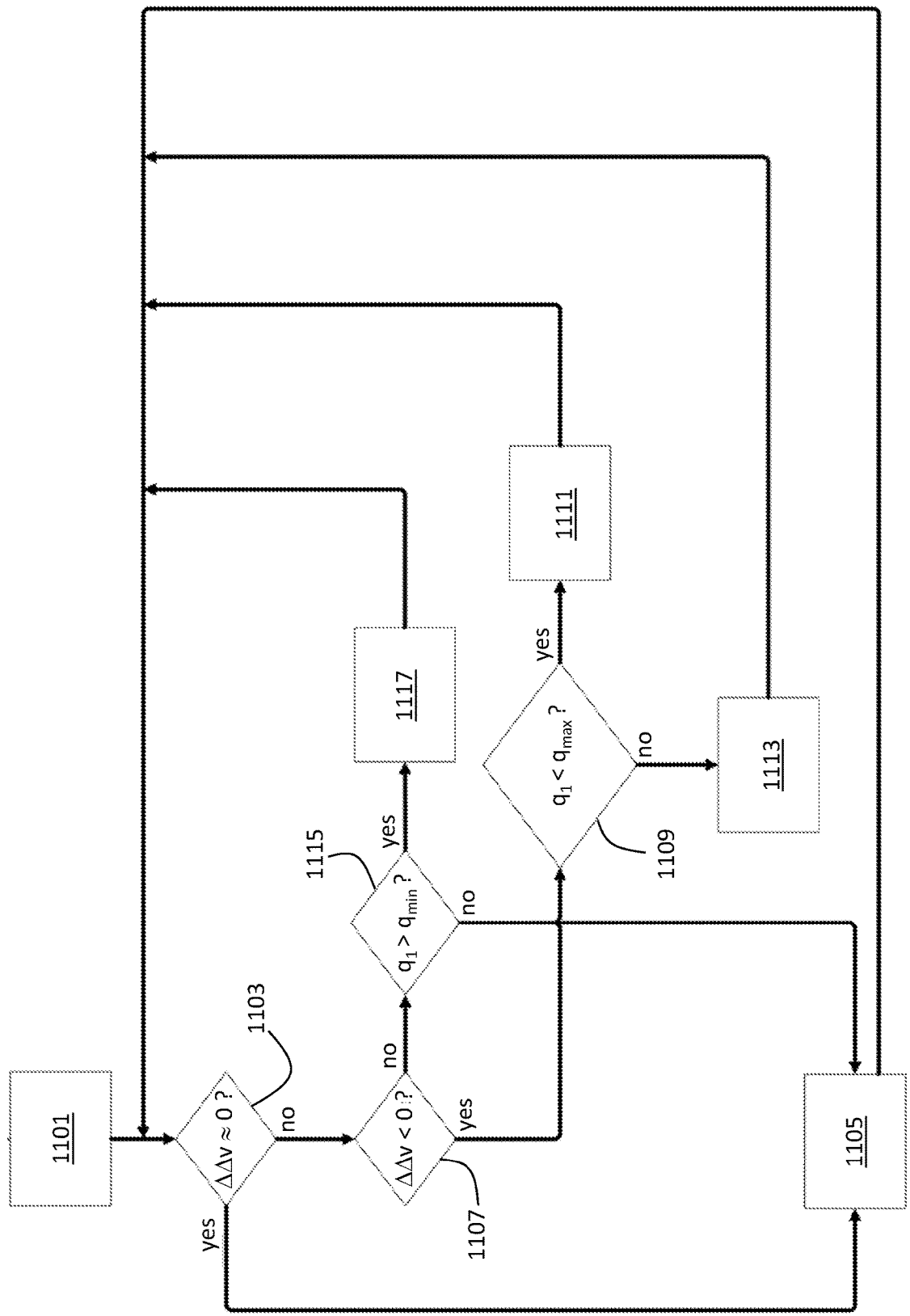
FIG. 11 is a schematic view of an example of the method for controlling the flow in a hydronic system according to the present disclosure.

FIG. 11 is a schematic view of an example of the method for controlling the flow in the hydronic system 1, wherein both the controllable primary side flow actuator 9 and the controllable secondary side flow actuator 13 are controllable by the flow control module 39. The hydronic system 1 may start up by ramping up (step 1101) the primary side flow $q_1$ and the secondary side flow $q_2$ to initial flows by means of a variable speed drive (VSD) or a motorised valve. Once the hydronic system 1 is started, a signed deviation value $\Delta\Delta v$ is continuously or regularly determined and monitored by the flow control module 39 to check (step 1103) whether it is approximately zero, i.e. in a small band between a negative reference value and a positive reference value. As previously described, the signed deviation value $\Delta\Delta v$ may be a temperature differential $\Delta\Delta T$, a pressure differential $\Delta\Delta p$, a flow differential $\Delta q$, a pressure differential $\Delta p$ or a measured common line flow $q$.

If the signed deviation value $\Delta\Delta v$ is approximately zero, the flow control module 39 maintains (step 1105) the primary side flow $q_1$ and the secondary side flow $q_2$. It should be noted that the primary side flow $q_1$ and/or the secondary side flow $q_2$ may change due to other control schemes. For instance, an opening of a load valve 15 in the secondary side 5 indicating a higher thermal power demand of the load element(s) 11 in the secondary side 5 may trigger an automatic internal secondary side pump controller to increase the pump speed. However, the continuously or regularly determined and monitored signed deviation value $\Delta\Delta v$ may be affected by this, whereby the flow control module 39 may be caused to adapt the primary side flow $q_1$ and/or the secondary side flow $q_2$ accordingly.

If the signed deviation value $\Delta\Delta v$ is not approximately zero (step 1103), it is checked (step 1107) whether it is negative, i.e. below a negative reference value. If this is the case, it is checked (step 1109) if the primary side flow $q_1$ is below a predetermined maximal threshold $q_{max}$. The maximal threshold $q_{max}$ may, for instance, be determined by the maximum speed of a speed-controlled primary side pump, a maximal opening of a primary side valve or a maximal flow requirement of the source element 7. The primary side flow $q_1$ may be measured by a flow meter 53a or be deduced from the current speed or the current power consumption of a primary side pump. If a further increase of the primary side flow $q_1$ is possible and allowed, the primary side flow $q_1$ is increased (step 1111). The effect of this adaptation on the signed deviation value $\Delta\Delta v$ is again continuously or regularly determined and monitored by the flow control module 39 (step 1103). If a further increase of the primary side flow $q_1$ is not possible or not allowed, the secondary side flow $q_2$ is decreased (step 1113). Again, the effect of this adaptation on the signed deviation value $\Delta\Delta v$ is continuously or regularly determined and monitored by the flow control module 39 (step 1103).

If the signed deviation value $\Delta\Delta v$ is not approximately zero (step 1103) and positive, i.e. above a positive reference value (step 1107), it is checked (step 1115) if the primary side flow $q_1$ is above a predetermined minimal threshold $q_{min}$. The minimal threshold $q_{min}$ may, for instance, be determined by the minimum speed of a primary side pump, a minimal opening of a primary side valve or a minimal flow requirement of the source element 7. If a further decrease of the primary side flow $q_1$ is possible and allowed, the primary side flow $q_1$ is decreased (step 1117). The effect of this adaptation on the signed deviation value $\Delta\Delta v$ is again continuously or regularly determined and monitored by the flow control module 39 (step 1103).

Where, in the foregoing description, integers or elements are mentioned which have known, obvious or foreseeable equivalents, then such equivalents are herein incorporated as if individually set forth. Reference should be made to the claims for determining the true scope of the present disclosure, which should be construed so as to encompass any such equivalents. It will also be appreciated by the reader that integers or features of the disclosure that are described as optional, preferable, advantageous, convenient or the like are optional and do not limit the scope of the independent claims.

The above embodiments are to be understood as illustrative examples of the disclosure. It is to be understood that any feature described in relation to any one embodiment may be used alone, or in combination with other features described, and may also be used in combination with one or more features of any other of the embodiments, or any combination of any other of the embodiments. While at least one exemplary embodiment has been shown and described, it should be understood that other modifications, substitutions and alternatives are apparent to one of ordinary skill in the art and may be changed without departing from the scope of the subject matter described herein, and this application is intended to cover any adaptations or variations of the specific embodiments discussed herein.

In addition, "comprising" does not exclude other elements or steps, and "a" or "one" does not exclude a plural number. Furthermore, characteristics or steps which have been described with reference to one of the above exemplary embodiments may also be used in combination with other characteristics or steps of other exemplary embodiments described above. Method steps may be applied in any order or in parallel or may constitute a part or a more detailed version of another method step. It should be understood that there should be embodied within the scope of the patent warranted hereon all such modifications as reasonably and properly come within the scope of the contribution to the art. Such modifications, substitutions and alternatives can be made without departing from the spirit and scope of the disclosure, which should be determined from the appended claims and their legal equivalents.

What is claimed is:

1. A flow control module for controlling the flow in a hydronic system, the hydronic system comprising:
a primary side with a first port in fluid connection with an output of at least one source element, a second port in fluid connection with an input of the at least one source element, and at least one controllable primary side flow actuator for providing a primary side flow;
a secondary side with a third port in fluid connection with an input of at least one load element, a fourth port in fluid connection with an output of the at least one load element, and at least one controllable secondary side flow actuator for providing a secondary side flow; and
an intermediary transfer element between the primary side and the secondary side, wherein the intermediary transfer element is in fluid connection with the first port, the second port, the third port and the fourth port, the flow control module comprising a control output for the primary side flow actuator and/or the secondary side flow actuator, wherein the flow control module is configured to minimize a thermal power transfer of the intermediary transfer element from the first port to the second port and/or from the fourth port to the third port, and/or to maximize the thermal power transfer of the intermediary transfer element from the first port to the third port and/or from the fourth port to the second port by continuous or regularly closed-loop controlling the primary side flow by means of the at least one controllable primary side flow actuator and/or controlling the secondary side flow by means of the at least one controllable secondary side flow actuator based on minimizing a signed deviation value being correlated with the thermal power transfer of the intermediary transfer element.

2. The flow control module according to claim 1, wherein:
a connection for receiving a group of four variables comprising a first variable of fluid flowing through the first port, a second variable of fluid flowing through the second port, a third variable of fluid flowing through the third port, and a fourth variable of fluid flowing through the fourth port;
the signed deviation value is a difference between a first differential and a second differential;
the first differential is a differential between any two measured variables of a group of four variables and the second differential is a differential between the other two measured variables of said group of four variables.

3. The flow control module according to claim 2, wherein:
the first variable is the temperature and/or pressure of fluid flowing through the first port;
the second variable is the temperature and/or pressure of fluid flowing through the second port;
the third variable is the temperature and/or pressure of fluid flowing through the third port; and
the fourth variable is the temperature and/or pressure of fluid flowing through the fourth port.

4. The flow control module according to claim 1, wherein:
the signed deviation value is a difference between a measured or determined flow in a common line as the intermediary transfer element and a zero common line flow.

5. The flow control module according to claim 1, wherein:
the signed deviation value is a difference between a flow differential in a heat exchanger as the intermediary transfer element and a zero heat exchanger differential flow.

6. The flow control module according to claim 1, wherein the flow control module is further configured to maintain a current primary side flow if the signed deviation value is essentially zero.

7. The flow control module according to claim 1, wherein the flow control module is further configured to increase the primary side flow if the signed deviation value is below a negative reference value.

8. The flow control module according to claim 1, wherein the flow control module is further configured to maintain the primary side flow if the signed deviation value is below a negative reference value and the primary side flow is at or above a predetermined maximum threshold.

9. The flow control module according to claim 1, wherein the flow control module is further configured to decrease the secondary side flow if the signed deviation value is below a negative reference value and the primary side flow cannot be increased.

10. The flow control module according to claim 1, wherein the flow control module is further configured to decrease the primary side flow if the signed deviation value is above a positive reference value.

11. The flow control module according to claim 1, wherein the flow control module is further configured to maintain a current primary side flow if the signed deviation value is above a positive reference value and the primary side flow is at or below a predetermined minimum threshold.

12. The flow control module according to claim 1, wherein the flow control module is integrated in one of the at least one controllable primary side flow actuator and/or one of the at least one controllable secondary side flow actuator.

13. The flow control module according to claim 1, wherein the flow control module is integrated in a cloud-based computer system and/or a building management system.

14. A method for controlling the flow in a hydronic system, wherein the hydronic system comprises: a primary side having a first port in fluid connection with an output of at least one source element, a second port in fluid connection with an input of the at least one source element, and at least one controllable primary side flow actuator for providing a primary side flow; a secondary side having a third port in fluid connection with an input output of at least one load element, a fourth port in fluid connection with an output of the at least one load element, and at least one controllable secondary side flow actuator for providing a secondary side flow; and an intermediary transfer element between the primary side and the secondary side, wherein the intermediary transfer element is in fluid connection with the first port, the second port, the third port and the fourth port, the method comprising:
minimizing a thermal power transfer of the intermediary transfer element from the first port to the second port and/or from the fourth port to the third port, and/or maximizing the thermal power transfer of the intermediary transfer element from the first port to the third port and/or from the fourth port to the second port by continuous or regularly closed-loop controlling the primary side flow by means of the at least one controllable primary side flow actuator and/or the secondary side flow by means of the at least one controllable secondary side flow actuator unit based on minimizing a signed deviation value being correlated with the thermal power transfer of the intermediary transfer element.

15. The method according to claim 14, further comprising acquiring a group of four variables comprises a first variable of fluid flowing through the first port, a second variable of fluid flowing through the second port, a third variable of fluid flowing through the third port, and a fourth variable of fluid flowing through the fourth port, wherein the signed deviation value is a difference between a first differential and a second differential, wherein the first differential is a differential between any two measured variables of the group of four variables and the second differential is a differential between the other two measured variables of said group of four variables.

16. The method according to claim 15, wherein:
the first variable is temperature and/or pressure of fluid flowing through the first port;
the second variable is the temperature and/or pressure of fluid flowing through the second port;
the third variable is the temperature and/or pressure of fluid flowing through the third port; and
the fourth variable is the temperature and/or pressure of fluid flowing through the fourth port.

17. The method according to claim 14, wherein:
the signed deviation value is a difference between a measured or determined flow in the common line as the intermediary transfer element and a zero common line flow.

18. The method according to claim 14, wherein:
the signed deviation value is a difference between a flow differential in a heat exchanger as the intermediary transfer element and a zero heat exchanger differential flow.

19. The method according to claim 14, wherein a current primary side flow is maintained if the signed deviation value is essentially zero.

20. The method according to claim 14, wherein the primary side flow is increased if the signed deviation value is below a negative reference value.

21. The method according to claim 14, wherein the primary side flow is maintained if the signed deviation value is below a negative reference value and the primary side flow is at or above a pre-determined maximum threshold.

22. The method according to claim 14, wherein the secondary side flow is decreased if the signed deviation value is below a negative reference value and the primary side flow cannot be increased.

23. The method according to claim 14, wherein the primary side flow is decreased if the signed deviation value is above a positive reference value.

24. The method according to claim 14, wherein a current primary side flow is maintained if the signed deviation value is above a positive reference value and the primary side flow is at or below a predetermined minimum threshold.

* * * * *